United States Patent [19]

Aihara et al.

[11] Patent Number: 5,613,171
[45] Date of Patent: Mar. 18, 1997

[54] CAMERA SYSTEM

[75] Inventors: Yoshihiko Aihara; Masayoshi Yamamichi, both of Kanagawa-ken; Masahisa Fujino, Tokyo, all of Japan

[73] Assignee: Canon Kabushiki Kaisha, Tokyo, Japan

[21] Appl. No.: 562,783

[22] Filed: Nov. 27, 1995

Related U.S. Application Data

[63] Continuation of Ser. No. 780,829, Oct. 23, 1991, abandoned, which is a continuation of Ser. No. 535,342, Jun. 8, 1990, abandoned, which is a continuation of Ser. No. 471,034, Jan. 26, 1990, abandoned, which is a continuation of Ser. No. 267,655, Nov. 3, 1988, abandoned, which is a continuation of Ser. No. 12,862, Feb. 10, 1987, abandoned.

[30] Foreign Application Priority Data

Feb. 13, 1986 [JP] Japan .................. 61-029767
Feb. 13, 1986 [JP] Japan .................. 61-029768
Feb. 17, 1986 [JP] Japan .................. 61-021416

[51] Int. Cl.$^6$ ............................ G03B 17/00
[52] U.S. Cl. ........................................... 396/531
[58] Field of Search ............................ 354/286

[56] References Cited

U.S. PATENT DOCUMENTS 4,464,034  8/1984  Tomino ................... 354/286
4,922,283  5/1990  Fukui ................... 354/286 X Primary Examiner—David M. Gray
Attorney, Agent, or Firm—Robin, Blecker, Daley & Driscoll

[57] ABSTRACT

An optical accessory comprises a bayonet type mount which can be freely mounted by rotation to a camera body having a camera mount of a bayonet type, a switch related to a power source and an operating member for actuating the switch. The optical accessory mount has a mounting claw arranged for pushing the operating member, the length of said mounting claw being so set that the mounting claw pushes the operating member for actuating the switch when the mounting by rotation of the optical accessory to the camera body is almost completed.

14 Claims, 2 Drawing Sheets

CAMERA SYSTEM

This is a continuation application under 37 CFR 1.62 of prior application Ser. No. 07/780,829, filed Oct. 23, 1991 abandoned, which is a continuation of Ser. No. 07/535,342, filed Jun. 8, 1990, abandoned, which is a continuation of Ser. No. 07/471,034, filed Jan. 26, 1990, now abandoned, which is a continuation of Ser. No. 07/267,655, filed Nov. 3, 1988, abandoned, which is a continuation of Ser. No. 07/012,862, filed Feb. 10, 1987, now abandoned.

BACKGROUND OF THE INVENTION

1. Field of the Invention

The present invention relates to a camera and, more particularly, it relates to a camera of lens-interchangeable type including a camera body and an interchangeable lens in which an electric connection of the interchangeable lens with the camera body is improved.

2. Description of the Related Art

Recently an automatic camera has become widely used. Such an automatic camera includes an automatic exposure control device, an automatic focusing device and/or an automatic light adjusting device, so that various electronic circuits, motor, battery or the like are mounted in the camera.

In the case of a camera of lens-interchangeable type 1 including a camera body and an interchangeable lens, in which various devices as mentioned above are contained, a motor, electronic circuits and the like are arranged in the camera body as well as in the interchangeable lens. Accordingly, electric contacts or connecting terminals for electrically connecting the various device in the camera body with those in the interchangeable lens are arranged on mount portions for connecting the camera body with the lens.

In the conventional camera of lens-interchangeable type, it has been the usual practice to arrange a ground line and a connecting terminal for the motor mounted in the lens and those for the electronic circuit so that they are commonly used, in order to reduce the number of connecting terminals. However, in the system in which the ground lines and the connecting terminals are arranged for common use, there is a danger that the electronic circuits of the lens and the camera body may be damaged owing to difference in ground potential between them.

For example, in the construction wherein electric power is transmitted from a power source in the camera through a power supply line and a terminal to the lens to supply the power to a motor circuit and/or an electronic circuit in the lens, at the time of supplying the power to the motor circuit the power is fed from the power source in the camera body through said power line to the motor circuit and then returned through the ground line and the terminal to said power source, so that a closed loop is formed to provide a power feeding path for the motor circuit. In this case, the current passing through the motor circuit is relatively large, so that said current produces a voltage drop at the ground line and the terminal when it is returned through said ground line and said terminal to the power source. If this ground line was commonly used in the motor circuit and the electronic circuit of the lens, the ground potential of the electronic circuit would be increased, by the amount of the above-mentioned voltage drop, as compared with the normal level, with the result that the electronic circuit of the lens would be adversely affected thereby.

Furthermore, in a camera of the above-mentioned type, if the lens was not properly mounted on the camera body, the contact terminals of the camera body and the lens would not be properly connected. Such a state would cause an accident wherein the lens could not be driven even if an instruction was sent from the camera body to the lens to effect some operation, such as driving of the motor and, moreover, such a state could produce various electrical accidents.

In order to avoid such accidents, a device For detecting the mounting of the lens, which is constructed to allow transmitting and receiving signals between the camera body and the lens only when the lens is properly mounted on the camera body, has been proposed, for example, in U.S. Pat. No. 4,492,429 and U.S. Pat. No. 4,464,034, etc. The device as proposed in these patents includes a switch associated with a mount locking member, which is so constructed that when the lens has been completely mounted on the camera body the mount locking member is pressed by the mount of the lens, with the result that said switch is actuated by said mount locking member.

However, according to the proposed construction in which the operation of the switch is effected by the mount locking member, it is quite possible that an operator may erroneously unlock said mount locking member owing to his careless operation. If the operator erroneously unlocked the mount locking member, the feeding of power to the electronic circuit in the lens would be broken, so that the transmitting and receiving signals between the camera body and the lens would become impossible, thereby making the operation of the camera itself impossible.

SUMMARY OF THE INVENTION

It is an object of the present invention to remove the problems caused by common use of aground line in the motor circuit and the electronic circuit in the lens.

In accordance with an aspect of the present invention there is provided a camera system including a camera body having a power source mounted therein and a lens having a driving motor and an electronic circuit arranged therein, wherein the driving motor and the electronic circuit have separate ground lines and terminals, so that a power is supplied from the power source in the camera body to said motor and said electronic circuit through the ground lines and the terminals, separately.

In accordance with another aspect of the present invention there is provided a camera system including a camera body having a power source and an electronic circuit mounted therein and an interchangeable lens having a driving motor and an electronic circuit mounted therein, in which a power ground line for grounding the motor in the lens and a signal ground line for grounding the electronic circuit in the lens and the electronic circuit in the camera body are separately provided for exclusive use, respectively, and in which a connecting terminal for exclusive use for power grounding which is connected to said power ground line and a connecting terminal for exclusive use for signal grounding which is connected to the ground line of the electronic circuit in said lens are disposed separately in an inside peripheral area of a mount formed on the camera body to mount the lens, thereby avoiding the problems caused by common use of the ground line as mentioned above.

In accordance with a further aspect of the present invention there is provided a camera system including a camera body having a power source and an electronic circuit mounted therein and a lens having a driving motor and an electronic circuit mounted therein, in which a signal for instructing start of the driving motor or the like is transmitted from the camera body to the lens through contacts formed on the lens and the camera body to effect control of the start of the driving motor, etc. in the lens; said camera system comprising mount means in the form of a bayonet type to be attached or detached by rotation, and a device for detecting the mounting of the lens onto the camera body which is arranged to come into contact with a part of a mount on the lens to be driven thereby at the terminal period of rotating motion of the mount on the lens during mounting the lens onto camera body, whereby the transmitting and receiving of said signal is allowed after detecting the proper mounting of the lens onto the camera body.

The other features and the objects of the present invention will be understood from the description of the embodiments of the present invention with reference to the drawings.

DETAILED DESCRIPTION OF THE PREFERRED EMBODIMENT

Now, a preferred embodiment of the present invention will be described with reference to the drawings.

Figure 1:
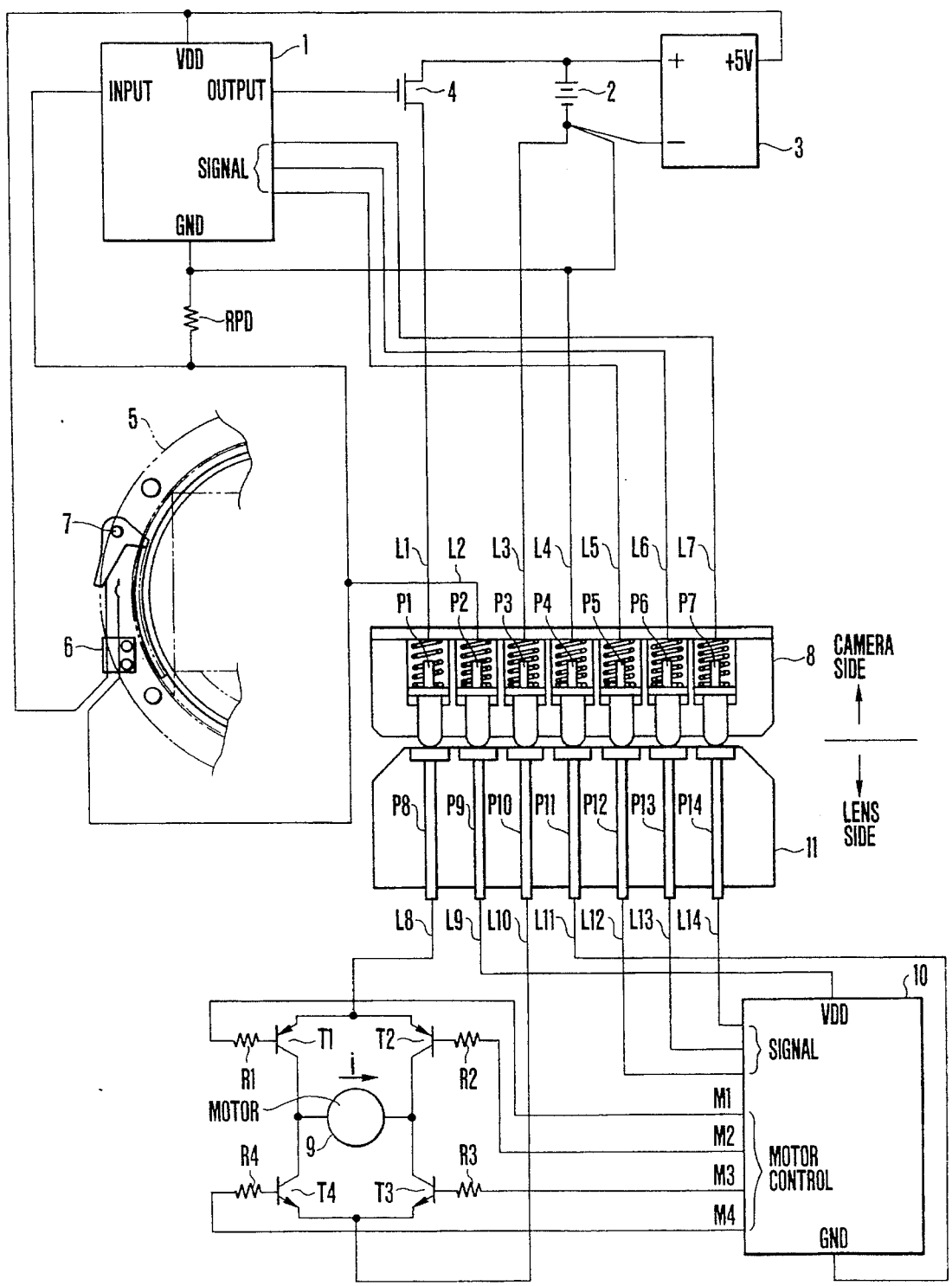
FIG. 1 is a circuit diagram showing an embodiment of the camera system which includes the connecting arrangement according to the present invention.

Referring to FIG. 1, the camera body includes an electronic circuit 1, a power source 2 such as a battery, a constant voltage output circuit 3 arranged to receive an electric power from said power source 2 and supply a constant voltage to said electronic circuit 1 and an electronic circuit mounted in the lens, as hereinafter described, an analog switch 4 arranged to turn on or off an electric power to be supplied to a motor (hereinafter described) mounted in the lens, a mount 5 arranged on the camera body to mount the lens thereon, a switch 6 arranged near said mount 5 to detect the mounting of the lens onto the camera body, and a member 7 arranged to be responsive to the mounting and demounting of the lens onto and from the camera body to actuate said switch 6. The member 7 is a rocking member which is pivotally mounted on the rear side of the mount 5. This member has two arms on opposite sides of its pivot point, and one of said arms is arranged to be engaged with and driven by a part of the mount at the side of the lens for connecting the camera body, while the other of said arms is arranged to urge one of the switch pieces of the switch 6 to detect the mounting of the lens onto the camera body.

The switch 6 for detecting the mounting of the lens has two switch pieces. These switch pieces are separated apart from each other when the lens is not mounted on the camera body, while they come into contact with each other when the lens is mounted on the camera body, thereby connecting the input terminal of the electronic circuit 1 and the output terminal of the constant voltage output circuit 3 with each other.

The camera body has a connecting terminal base 8 which is disposed in the inside peripheral area of the lower part of the mount 5 which is arranged to mount the lens on the camera body. Said connecting terminal base 8 has a plurality of connecting terminals (or contact pins) P1–P7 which are arranged to come into contact with a plurality of connecting terminals (or electrical contacts) provided on the lens, respectively. Each of these connecting terminals P1–P7 is energized by a spring so that it is projected forwardly of the front surface of said terminal base 8. The connecting terminals are separately connected with lines L1–L7, respectively, formed on a print circuit board mounted on the camera body.

The line L1 connected with the terminal P1 constitutes a motor power source line which is arranged to supply an electric power from the power source 2 in the camera body to a motor (hereinafter described) in the lens, and the analog switch 4 as described above is connected in said line L1.

The line L2 connected with the terminal P2 is connected with the switch 6 for detecting the mounting of the lens and it is also connected with the input terminal of the electronic circuit 1. The line L3 connected with the terminal P3 constitutes a power ground line, which is connected to a negative electrode of the power source 2.

The line L4 connected with the terminal P4 is arranged to be connected with a ground line of the electronic circuit in the lens, as hereinafter described, and said line L4 is connected with the ground terminal of the electronic circuit 1 in the camera body and the negative electrode of the power source 2.

The lines L5–L7 connected with the connecting terminals P5–P7, respectively, constitute signal lines which carry signals between the electronic circuit 1 in the camera body and the electronic circuit in the lens. These lines L5–L7 are connected with the signal terminals of the electronic circuit 1.

The interchangeable lens is arranged to be detachably attached to the camera body which is constructed as explained above. The interchangeable lens includes, mounted therein, a motor 9 for driving an automatic focusing mechanism, a motor control switch for changing over a feeding direction of an energizing current of said motor 9 and an electronic circuit 10 arranged to send and receive various signals to and from the electronic circuit 1 in the camera body. The interchangeable lens further includes a camera connecting mount (not shown) arranged to be detachably connected to the lens connecting mount on the camera body, and a connecting terminal base 11 which is disposed in the inside peripheral area of the lower part of said camera connecting mount in opposing relation to the connecting terminal base 8 of the camera body.

The connecting terminal base 11 provided on the interchangeable lens has seven connecting terminals (or contact pins) P8–P14 which are arranged to contact with the connecting terminals P1–P7 on the camera body, respectively, as shown in FIG. 1. The connecting terminals P8–P14 have lines L8–P14 which are separately connected with these terminals.

The lines L8 and L10 are connected with the motor 9 through a motor control device, which will be hereinafter described, and they constitute power lines for passing larger current, as compared with the other lines L9 and L11–L14. The line L8 forms a power supply line for the motor and the line L10 forms a power ground line for grounding one pole of the motor 9, as hereinafter described.

The line L9 connected with the terminal P9 constitutes a power supply line for the electronic circuit to supply a current to the electronic circuit 10 in the lens. This line is arranged to be connected with the power source terminal of the electronic circuit 10 and also connected through the connecting terminals P9 and P2 with the line L2 in the camera body.

The line L11 is arranged to be connected with the ground terminal of the electronic circuit 10 and also connected through the connecting terminals P11 and P4 with the line L4 in the camera body, thereby constituting a signal ground line of the electronic circuit 10 in the interchangeable lens.

The lines L12–L14 are connected with the signal terminals of the electronic circuit 10 and also separately connected with the connecting terminals P12–P14. Furthermore, they are arranged to be connected through the connecting terminals P12–P14 at the lens side and the terminals P5–P7 at the camera body side with the lines L5–L7 in the camera body, separately. Thus, the lines L12–L14 constitute signal lines at the lens side.

The motor control device for changing over the current feeding direction of the motor is constituted by four transistors T1–T4, including two pairs of NPN transistor and PNP transistor, and one of the pairs is connected with one pole of the motor 9, while the other pair is connected to the other pole of the motor 9. The PNP transistors T1 and T2 of the respective pairs are connected with the line L8 in the interchangeable lens and said line L8 is connected through the connecting terminal P8 in the connecting terminal base 11 with the line L1 in the camera body. (In other words, the line L8 together with the line L, constitute a power feeding line to feed an electric power to the motor 9.)

One pole of the motor 9 is connected with the respective collectors of the pair of PNP transistor T1 and NPN transistor T4, while the other pole of the motor 9 is connected with the respective collectors of the pair of PNP transistor T2 and NPN transistor T3. On the other hand, the emitters of the NPN transistors T3 and T4 of the respective pairs of transistor are connected with the line L10. The line L10 constitutes a power ground line disposed in the interchangeable lens. Said line L10 serves to connect the negative pole side of the motor 9 through the connecting terminal P10 to the connecting terminal P3 at the camera body side. It is connected through the line L3 at the camera body side to the negative electrode of the power source 2.

The electronic circuit 10 has control terminals to control the respective transistors T1–T4 of the motor control device, and the respective control terminals are connected with the bases of the respective transistors T1–T4 by signal lines M1–M4, respectively. The signal lines include resistors R1–R4, respectively.

As explained above, the characteristic feature of the present invention resides in the fact that the ground line and the connecting terminal for the ground line for the motor 9 is separate from those for the electronic circuit, and they are arranged for exclusive use, respectively. Now, the operation of the parts of the construction as shown in the drawings will be explained.

(i) In the case where the lens is not mounted on the camera body:

When the lens is not mounted on the camera body, the terminal base 11 of the lens is separated apart from the terminal base 8 of the camera body. Accordingly, the connecting terminals P1–P4 of the camera body and the connecting terminals P6–P14 of the camera body are not contacted with each other. The detecting switch provided on the lens connecting mount 5 of the camera body to detect the mounting of the lens is in such state that the two switch pieces are separated apart from each other. Accordingly, the input terminal of the electronic circuit 1 is connected through a pressure reducing resistor PRD with the negative side of the power source 2 and thus the electronic circuit is in such state that a voltage at low level near the ground potential is applied to said input terminal. Therefore, a voltage at high level to hold the analog switch 4 in OFF state (open state) is produced from the output terminal, so that the analog switch 4 is held off and thus the connecting terminal P1 is cut off from the power source 2.

(ii) In the case where the lens is mounted on the camera body:

When the lens is mounted on the camera body, the mount provided on the lens is rotated in clockwise direction, as viewed in the drawings, relatively to the lens connecting mount 5. Accordingly, the member 7 responsive to the mounting and demounting of the lens is rotated in counterclockwise direction around its pivot point by the camera connecting mount of the lens, with the result that one switch piece of the detecting switch 6 is pushed by one arm of the detecting switch 6, so that the switch pieces of said detecting switch 6 come into contact with each other and thus said switch 6 comes into ON-state. Accordingly, the 5 V output terminal of the constant voltage output circuit 3 is connected through said switch 6 with the input terminal of the electronic circuit 1, so that the input voltage at high level (5 volt) is applied to said input terminal. Therefore, the voltage level at the output terminal of the electronic circuit 1 is converted from "H" to "L" and the analog switch 4 comes into ON-state, so that the positive side of the power source 2 is connected with the connecting terminal P1.

When the lens has been completely mounted onto the lens connecting mount 5 of the camera body, the connecting terminals P1–P7 at the camera side come into contact with the connecting terminals P8–P14 at the lens side, as shown in FIG. 1, so that the lines L1–L7 at the camera body side are connected through the connecting terminals P1–P14 with the lines L8–L14 at the lens side, with the result that the connection as shown in FIG. 1 is completed. (In this regard, it is to be noted that although the detecting switch 6 is shown in open state in FIG. 1, said switch 6 is held in closed state when the lens has been completely mounted on the camera body.)

After completely mounting the lens onto the camera body, control signals concerning the operation (mainly, the focusing operation) of the camera is transmitted from the electronic circuit of the camera body through the lines L5–L7 and lines L12–L14 to the electronic circuit 10 of the lens and at the same time signals concerning the motor 9 are transmitted from the electronic circuit 10 of the lens to the electronic circuit 1 of the camera. For example, it is assumed that the electronic circuit 1 transmits control signals to cause the electronic circuit 10 to produce a signal at "L" level on the line M1 and a signal at "H" level on the line M3. Then, the transistors T1 and T3 are made conductive and a current is fed through the line L8 and the transistor T1 to the motor 9 in the direction as indicated by an arrow i in FIG. 1, so that the motor 9 is rotated in forward direction. Said current is passed through the transistor T3, the line L10, the connecting terminals P10 and P3 and the line L3 and returned to the negative side of the power source 2.

If signals are transmitted from the electronic circuit 1 through the lines L5–L7 to the electronic circuit 10 to rotate the motor 9 in reverse direction, the electronic circuit 10 produces a signal at "L" level on the line M2 and a signal at "H" level on the line M4 (at this time, the signal on the line M1 is at "H" level and the signal on the line M3 is at "L"

level), with the result that the transistors T2 and T4 are made conductive and a current is fed through the transistor T2 to the motor 9 in the direction opposite to that indicated by the arrow i, so that the motor 9 is rotated in reverse direction.

Whether the motor 9 is rotated in forward direction or reverse direction, as explained above, the current from the motor 9 is returned through the line L10 and the connecting terminal P10 at the lens side and then through the connecting terminal P3 and the line L3 at the camera body side to the negative electrode of the power source 2. At the time when the current is being fed to the motor 9, as described above, a contact resistance is produced at the connection between the connecting terminals P10 and P3 (that is, a voltage drop is produced) and, consequently, a difference is produced between a potential of the line L10 at the lens side and a potential of the line L3 (namely, the ground potential of the power source 2) at the camera body side. Therefore, the actual ground potential of the motor 9 is substantially increased as compared with the ground potential of the power source 2. (For example, if it is assumed that the current fed to the motor 9 is 1A and the contact resistance between the connecting terminals P3 and P10 is 1Ω, then the ground potential of the motor 9 is not 0 V but 1 V.)

In the conventional camera of lens-interchangeable type, the ground line and the connecting terminal for grounding are arranged for common use by the electronic circuit and the motor, so that the ground potential of the electronic circuit 10 in the lens varies depending upon the current fed into the motor 9, and the ground potential of the electronic circuit in the lens may become higher than the value of the signal potential when a large current is fed into the motor 9. If the ground potential of the electronic circuit is increased to such extent, the electronic circuit in the lens may be damaged.

As compared with the conventional camera as described above, the present invention provides a camera in which the signal ground line and the connecting terminal for the electronic circuit and the ground line and the connecting terminal for the motor are arranged in independent from, for exclusive use, respectively, so that there is no possibility that the electronic circuit is adversely affected by the motor.

Figure 2:
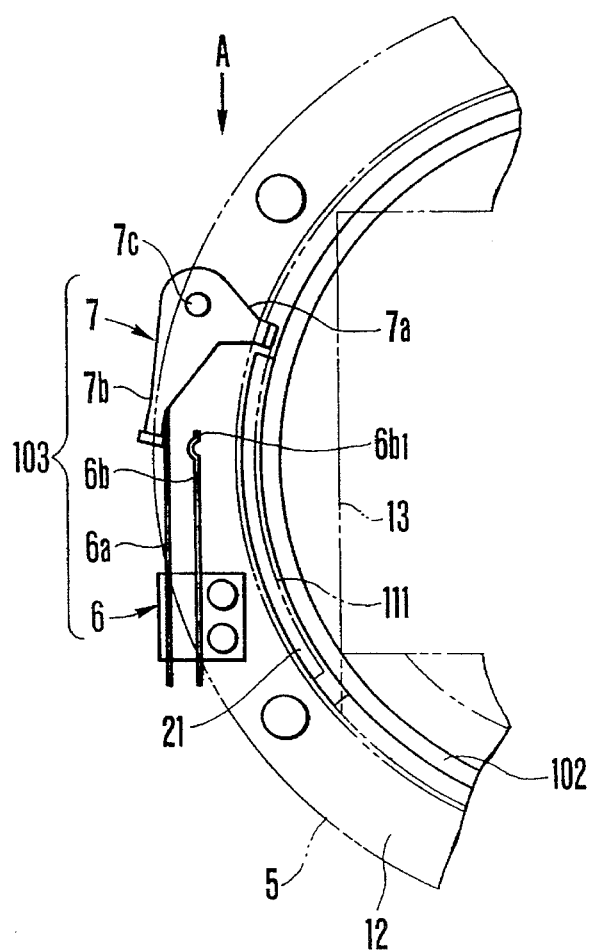
FIG. 2 is a front view showing the state where the mount at the lens side is being connected with the mount at the camera body side.
Figure 3:
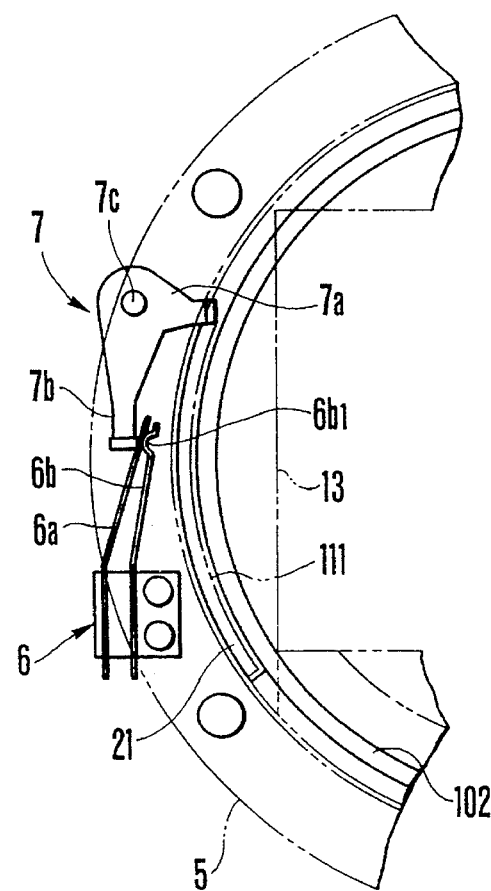
FIG. 3 is a front view showing the state where the mount at the lens side has been completely connected with the mount at the camera body side.
Figure 4:
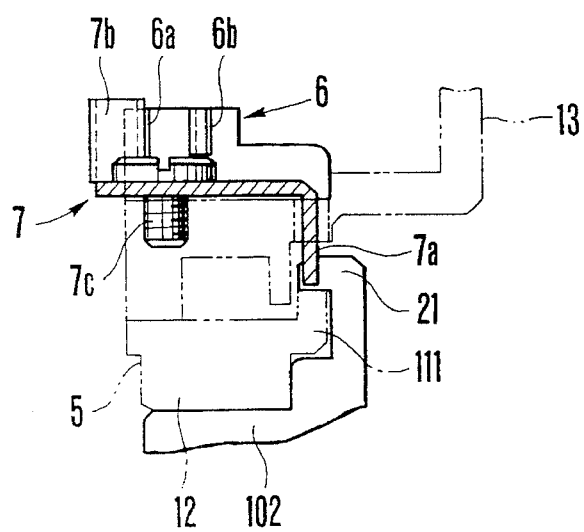
FIG. 4 is a plan view, partly in section, seen in the direction indicated by the symbol A from the rear side.

FIGS. 2 and 3 are detailed front views showing the mount on the camera body as shown in FIG. 1. FIG. 2 illustrates the state where the mount at the side of the lens is being mounted onto the mount at the side of the camera body and the detecting device for detecting the mounting of the lens is at the position just before starting its operation. FIG. 3 illustrates the state where the lens has been completely mounted onto the camera body. FIG. 4 is a plan view, partly in section, seen in the direction as indicated by the arrow A in FIG. 2.

Referring to FIGS. 2–4, the camera body has the mount 5 as described above, while the lens has a mount 102 which is arranged to be detachably connected to said mount 5. The mount 5 at the camera body has an abutting surface 12 and three pawls projecting inside of said abutting surface, one of said pawls being indicated by numeral 111. The mount at the lens side has a pawl 21 which engages with said one pawl 111 of the mount. The camera body has a mirror box 13 therein.

By the term "camera mounting pawl" is meant a protrusion on the camera body for mounting an accessory on the camera body, the protrusion being formed in a substantially circular arc shape contactable with the accessory mounting pawl and projecting in a direction transversely of the optical axis. This is seen particularly for member 111 in FIGS. 2, 3 and 4.

The member 7 responsive to the mounting of the lens, which forms a part of the detecting device 103 for detecting the mounting of the lens, is arranged at the rear side of the abutting surface 12 of the mount 5. The responsive member 7 is actuated by the rotating operation of the mount 102 of the lens at the time of mounting the lens onto the mount 5 of the camera body and at the time of demounting the lens from said mount 5. In the embodiment illustrated in these drawings, the member 7 is a rocking member having two arms 7a and 7b. The responsive member 7 is pivotally supported at its base portion of the arms 7a and 7b on the rear side of the mount 5 of the camera body by means of a pivot pin 7c which extends in parallel with the optical axis of the camera. The forward end of the one arm 7a is arranged to project to the terminal end position of the area of rotation of the pawl 21 of the mount 102 of the lens and come into engagement with said pawl 21. (In other words, the forward end of the arm 7a is so positioned that it comes into engagement with the pawl 21 of the mount of the lens at the terminal period of the rotation of the rotation of the mount 102 during mounting the lens onto the camera body.)

The forward ends of the arms 7a and 7b are bent at right angle in opposite directions to each other The abutting portion 7a is disposed rearwardly of camera mounting pawl 111, as seen in FIG. 4. with respect the plane of FIG. 2. Otherwise stated, portion 7a is located immediately inwardly of the camera mounting pawl along an axis parallel to an optical axis of the camera. The forward end of the other arm 7b engages with one of a switch pieces 4a of the switch 6 arranged on the rear side of the mount 5 of the camera body. The switch 6 and the responsive member 7 constitute the detecting device 103 for detecting the mounting of the lens, and said switch includes two switch pieces 6a and 6b having high elastic repulsive force. These switch pieces 6a and 6b are arranged in parallel relationship to each other, so that these pieces are separated to hold its OFF state, as shown in FIG. 2, unless an external force is applied thereto. When the switch piece 6a is pushed by the arm 7b of the responsive member 7 as shown in FIG. 3, said switch piece 6a comes into contact with the bent portion 6b, of the switch is turned ON.

Now the description will be made to the operation of the several parts of the construction as described above at the time of mounting and demounting the interchangeable lens onto and from camera body.

When the lens is not mounted on the mount 5 of the camera body or the lens is not completely mounted on said mount, the responsive member 7 is in the position as shown in FIG. 2, where the two switch pieces 6a and 6b of the switch 6 are separated from each other, that is, the switch is in OFF position.

At the time of mounting the lens on the camera body, the mount 102 of the lens is fitted with the mount 5 of the camera body and then the mount 102 of the lens is rotated in the clockwise direction relatively to the mount 5 of the camera body. Then the pawl 111 of the mount of the camera body comes into engagement with the pawl 21 of the lens. However, before the pawl 21 of the mount of the lens reaches the terminal end of its rotation (that is, immediately before the lens is completely mounted), the pawl 21 of the mount of the lens does not come into engagement with the arm 7a of the responsive member 7, so that the switch 6 is not turned ON. When the mount 102 is further rotated in the clockwise direction from the state shown in FIG. 2, the pawl 21 of the mount of the lens pushes the arm 7a of the member 7 in upward direction, as viewed in FIG. 2, so that the member 7 is rotated in clockwise direction around the pivot pin 7c, with the result that the other arm 7b pushes the switch piece 6a of the switch 6. Accordingly, the switch pieces 6a and 6b come into contact with each other, as shown in FIG. 3, and thus the switch 6 is turned ON, while the pawl 21 of the mount of the lens stops at a predetermined position. Thus the lens is completely mounted on the camera body (as shown in FIG. 2).

When demounting the lens from the camera body on which the lens is completely mounted as shown in FIG. 3, the mount 102 of the lens is rotated in counter-clockwise direction relatively to the mount 5 of the camera body, as viewed in FIG. 3. As the rotation is started, the force acting to energize the arm 7a of the member 7 in upward direction disappears, so that there is no obstruction against the arm 7a. Thus the member 7 is rotated in clockwise direction around the pivot pin 7c under the elastic restoring force of the switch piece 6a acting to push the other arm 7b, and at the same time the switch piece 6a is separated from the switch piece 6b, so that the switch 6 is turned OFF. This OFF state is produced when the pawl 21 of the mount of the lens is slightly rotted in counter-clockwise direction from the position shown in FIG. 3 (that is, immediately after the lens is moved from the completely mounted state to the incompletely mounted state). In other words, the switch is turned OFF, when the lens is moved, even slightly, from the completely mounted state.

It will be understood that the present invention provides a camera system in which the damage or the malfunction of the electronic circuit of the lens side and/or the electronic circuit of the camera body side which may be caused by the current fed to the motor in the lens is completely avoided. The malfunction of the camera is further avoided, since the feeding of power from the camera body to the lens is prohibited if the lens is not properly mounted on the camera body.

Although the member 7 responsive to the mounting of the lens is shown as constructed to operate the switch 6 by the one arm 7b in the embodiment as described above, the construction may be modified such that the pivot pin 7c of the member 7 is arranged as a rotary shaft which is rotated with said member 7 and a contactless switch is associated with said rotary shaft.

What is claimed is:

1. A camera body having a bayonet type mount with a mounting pawl which can have an optical accessory mounted thereon by rotation of the accessory, comprising:
   (a) a switch related to a power source; and
   (b) an operating member for actuating said switch, said operating member actuating said switch as said operating member is pushed by an accessory mounting pawl of the optical accessory when said optical accessory is mounted by rotation, said operating member having an abutting portion which abuts said accessory mounting of the optical accessory being positioned immediately inwardly of said camera mounting pawl along an axis parallel to an optical axis of said camera, said camera mounting pawl comprising a protrusion on the camera body formed in a substantially circular arc shape and projecting in a direction transversely of the optical axis.

2. A camera body according to claim 1, wherein said operating member is supported in a freely rotatable manner and has a base, only said abutting portion being positioned along said axis inwardly of said mounting pawl.

3. An optical accessory having bayonet type mount which can be freely mounted by rotation on a camera body having a camera mount with a mounting pawl, a switch related to a power source and an operating member for actuating said switch, comprising:

a pushing part of an accessory mounting pawl disposed at a position deviated from the position of an abutting surface of said mount of said optical accessory, wherein said pushing part pushes said operating member at a location immediately inwardly of said camera mounting pawl along an axis parallel to an optical axis of said camera for actuating said switch when the mounting action by rotation of said optical accessory to said camera body is almost completed, said camera mounting pawl comprising a protrusion on the camera body formed in a substantially circular arc shape and projecting in a direction transversely of the optical axis.

4. An optical accessory according to claim 3, wherein said pushing part pushes said operating member on an end surface thereof in a direction around the optical axis.

5. A camera body according to claim 1, wherein said optical accessory is an interchangeable lens.

6. An optical accessory according to claim 3, wherein said optical accessory is an interchangeable lens.

7. An optical accessory comprising a bayonet type mount which can be freely mounted by rotation with respect to a camera body having a camera mount of a bayonet type and a camera mounting pawl, a switch related to a power source and an operating member disposed immediately inwardly of said camera mounting pawl along an axis parallel to an optical axis of said camera for actuating said switch, wherein said optical accessory mount has a mounting pawl arranged for pushing said operating member, the length of said accessory mounting pawl being so set that said accessory mounting pawl pushes said operating member for actuating said switch when the mounting by rotation of said optical accessory to said camera body is almost completed said camera mounting pawl comprising a protrusion on the camera body formed in a substantially circular arc shape projecting in a direction transversely of the optical axis.

8. An optical accessory according to claim 7, wherein said accessory mounting pawl pushes said operating member on an end surface thereof in a direction around an optical axis.

9. An optical accessory according to claim 7, wherein said optical accessory is an interchangeable lens.

10. A camera system, comprising:
   (a) a camera body having a camera mount of a bayonet type and a mounting pawl, comprising:
      (a-1) a switch related to a power source; and
      (a-2) an operating member for actuating said switch, a portion of said operating member being positioned immediately inwardly of said camera mounting pawl along an axis parallel to an optical axis of said camera; and
   (b) an optical accessory having an accessory mount of a bayonet type which can be mounted by rotation on said camera mount, comprising:
      (b-1) a pushing part of an accessory mounting paw provided at a position deviated from a position of an abutting surface of said accessory mount toward the direction of the optical axis, said pushing part pushing said portion of the operating member for actuating said switch when the mounting by rotation of said optical accessory on said camera body is almost completed, said camera mounting pawl comprising a protrusion on the camera body formed in a substantially circular arc shape and projecting in a direction transversely of the optical axis.

11. A camera system according to claim 10, wherein said operating member is pushed by an end surface of said accessory mounting pawl in a direction around the optical axis.

12. A camera system according to claim 10, wherein said optical accessory is an interchangeable lens.

13. A camera body having an optical axis and a mount which can have an optical accessory mounted thereon by rotation of the accessory, comprising:
  (a) a switch related to a power source; and
  (b) an operating member for actuating said switch, said operating member being disposed in said camera body rearwardly of a portion of said camera body mount and hence inaccessible to said optical accessory during movement of said optical accessory along said camera body optical axis.

14. An optical accessory having a mount which can be mounted by rotation on a mount of a camera body, a switch related to a power source and an operating member for actuating said switch, said optical accessory comprising a mount rotatable on said camera body mount in circumscribing relation to said camera body mount, said optical accessory mount comprising a first part for operating said camera body switch and a second part for circumscribing said camera body mount.

* * * * *

UNITED STATES PATENT AND TRADEMARK OFFICE
CERTIFICATE OF CORRECTION

PATENT NO. : 5,613,171
DATED : March 18, 1997
INVENTOR(S) : Aihara et al.

It is certified that error appears in the above-identified patent and that said Letters Patent is hereby corrected as shown below:

Column 1,
Line 26, delete "type 1" and insert -- type, --.

Column 2,
Line 7, delete "For" and insert -- for --.
Line 33, delete "aground" and insert -- a ground --.

Column 8,
Lines 23-25, delete "The abutting portion 7a is disposed rearwardly of camera mounting pawl 111, as seen in FIG 4. with respect the plane of FIG. 2." and insert -- with respect the plane of FIG. 2. The abutting portion 7a is disposed rearwardly of camera mounting pawl 111, as seen in FIG. 4. --.

Column 9,
Line 20, delete "rotted" and insert -- rotated --.
Line 53, delete "paw" and insert -- pawl --.

Signed and Sealed this

Twelfth Day of March, 2002

Attest:

Attesting Officer

JAMES E. ROGAN
*Director of the United States Patent and Trademark Office*